April 30, 1968

J. C. HANKS 3,381,301

INCLINED LIGHT BAR OSCILLOGRAPHIC RECORDER

Filed Aug. 8, 1966

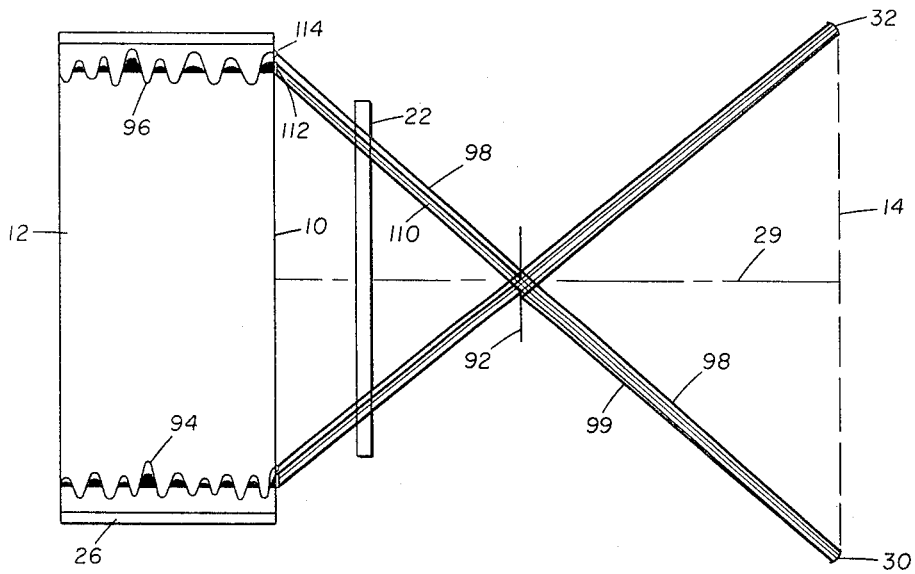
FIG. 6
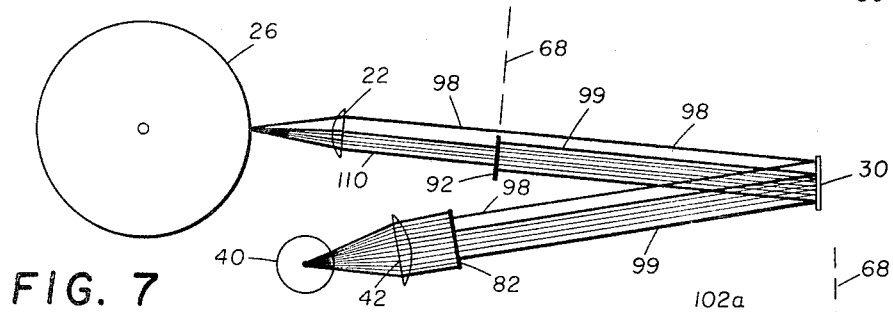
FIG. 7
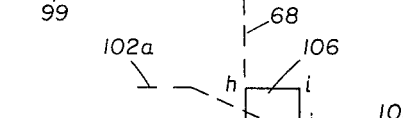
FIG. 11
FIG. 8
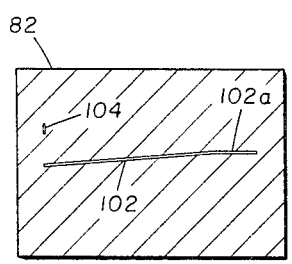
FIG. 9
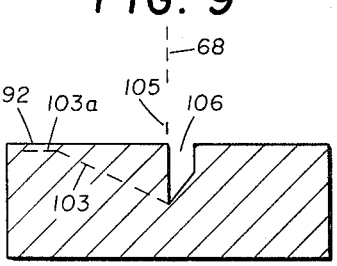
FIG. 10
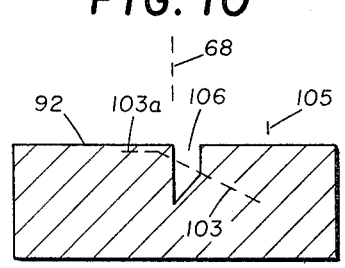

United States Patent Office 3,381,301
Patented Apr. 30, 1968

3,381,301
**INCLINED LIGHT BAR OSCILLOGRAPHIC
RECORDER**
Jimmy C. Hanks, Irving, Tex., assignor to Mobil Oil
Corporation, a corporation of New York
Filed Aug. 8, 1966, Ser. No. 571,105
9 Claims. (Cl. 346—109)

ABSTRACT OF THE DISCLOSURE

The specification discloses an oscillographic recorder for producing a series of double-sided variable area traces simultaneously. A row of mirror galvantometers is mounted parallel to a recording drum transporting a recording medium. A linear light source is so positioned to illuminate each galvanometer mirror that each mirror reflects a light beam whose cross-sectional shape includes a light bar inclined at an angle less than ninety degrees with respect to the axis of rotation of the galvanometers. A mask having a single nonsymmetrical tapering aperture is positioned in the light path between the galvanometer mirrors and the recording medium. In another embodiment, using two light beams, a wiggle trace recording is produced having partially shaded variable area.

---

This invention relates to the art of oscillographic recording, and more particularly to a novel apparatus for recording variable area representations of time varying signals on a light-sensitive recording medium.

Since the invention is particularly useful in reflection seismic exploration, an illustrative application of the use of the invention will be described with reference to the oscillographic recording of seismic signals or traces. However, it will be understood that the present invention is equally applicable to other arts and fields in which a time scale record is desired to be made from a time varying input signal.

In making seismic surveys by the reflection method, a seismic disturbance is created, usually by means of dynamite, at or near the earth's surface and the reflected waves from subsurface layerings are detected at geophones spaced apart in a selected pattern on the earth's surface. The geophones convert the reflected seismic waves into representative electrical signals. These electrical signals are then amplified and recorded in some reproducible manner such as on magnetic tape.

After the recorded signals are processed with certain operations to improve their quality, they are usually presented on a visual display called a seismic cross section. The seismic cross section is made up of a plurality of side-by-side seismic traces, one trace for each geophone group at which seismic waves were received in the field. The seismic cross sections are ordinarily produced by an oscillographic recorder located at an office playback center.

A seismic cross section may take various forms, depending upon which form of presentation a seismologist interpreting the cross section thinks best represents the subsurface layering of the earth. Commonly, it may be comprised of wiggle trace recordings wherein each trace is produced in the form of an oscillatory line whose amplitude of excursion varies in proportion to the amplitude of the seismic waves received at the geophones in the field. The oscillatory line varies along a time base on the length of the cross section in proportion to the time at which the seismic waves were received at the geophones after the generation of the seismic disturbance.

Another popular type of cross section recording, called variable area, includes traces in which a shaded area of equal density varies in width along the time base in proportion to the amplitude of the seismic waves received in the field. There are two main types of variable area traces. One type, called single-sided variable area, varies in width to one side of a reference line. The other type, called double-sided variable area, is similar to that of the single-sided except that the trace is symmetrical about a reference center line. Many seismologists prefer the double-sided variable area type of cross section as an aid to the human eye in interpreting the condition of the subsurface layerings of the earth and in deducing the possibility of oil or gas bearing formations.

Still another form of seismic cross section recording is a combination of wiggle trace and variable area trace recording. In this type recording, a wiggle trace is recorded as with a conventional wiggle trace. Superimposed on the wiggle trace is a single-sided variable area that shades a proportionate part of the wiggle peaks. This combination of wiggle trace and partially shaded variable area permits the seismologist to make quantitative measurements of amplitudes of reflections along the wiggle trace portion at the same time the shaded variable area portion makes the reflections lining up across a cross section stand out in appearance.

The conventional oscillographic recorder for producing a seismic cross section includes a mirror galvanometer in which the mirror oscillates about an axis by an amount dependent upon the instantaneous amplitude of the seismic signal supplied to it. The mirror is positioned to receive light energy from an appropriate light source and to reflect a light beam onto a moving light-sensitive medium to form the seismic traces comprising a record section. In most oscillographic recorders, the recording galvanometer is mounted so that its mirror rotates about an axis which is perpendicular to the direction of movement of the light-sensitive recording medium. In some oscillographic recorders, multiple galvanometers are used to produce a plurality of traces on a cross section simultaneously. When multiple galvanometers are used, they must ordinarily be mounted to rotate about an axis planar with the direction of movement of the recording medium. Sometimes even in a single galvanometer oscillographic recorder it is necessary to mount the recording galvanometer for rotation about an axis planar with the direction of movement of the recording medium because of the confines of space in the recorder instrument housing.

In the past, it was thought impossible to produce a double-sided variable area trace with a galvantometer mounted so that its mirror rotates about an axis planar with the direction of movement of the recording medium. Furthermore, it was thought impossible to produce, with a galvanometer so mounted, a combination wiggle-variable area trace as described above.

Accordingly, the present invention provides novel apparatus for producing variable area traces and combinations of variable area traces with a galvanometer mounted with its axis of rotation planar with the direction of movement of a recording medium. In accordance with the invention, there is provided an oscillographic recorder including a mirror galvanometer with its mirror pivotally mounted for oscillation about an axis in response to an applied electrical signal. A linear light source is so positioned to illuminate the galvanometer mirror that the mirror reflects a light beam whose cross-sectional shape includes a light bar inclined at an angle less than ninety degrees with respect to the rotational axis of the mirror. A light-sensitive recording medium is adapted for movement past a recording station in a direction planar with the axis of rotation of the galvanometer mirror. A masking means having an aperture tapering about a center line which is planar with the axis of rotation of the galvanometer mirror blocks the reflected light beam except for the portion passing through the tapering aperture to the recording station. The portion of the light beam passing through the aperture and striking the recording medium then produces a variable area trace on the recording medium.

In accordance with another aspect of the present invention, there is provided apparatus for producing a wiggle trace recording with partially shaded variable area.

There will now be described the details of the present invention with reference to the accompanying drawings in which:

FIGURE 6 is a diagrammatic illustration of the top view of an oscillographic recorder for simultaneously producing a plurality of wiggle traces with partially shaded variable area;

FIGURE 7 is a diagrammatic illustration of the side view of the recorder of FIGURE 6;

FIGURE 8 is a plan view of the mask for generating the two light beams supplied to the galvanometer mirrors in the recorder of FIGURES 6 and 7;

FIGURES 9 and 10 illustrate the masking means of FIGURES 6 and 7 with the two light beams for the wiggle trace and the shaded variable area projected thereon in two different positions; and FIGURE 11 illustrates an enlarged view of the geometrical construction of the tapering aperture of the masking means in FIGURES 6 and 7.

*Double-sided variable area recording*

Figure 1:
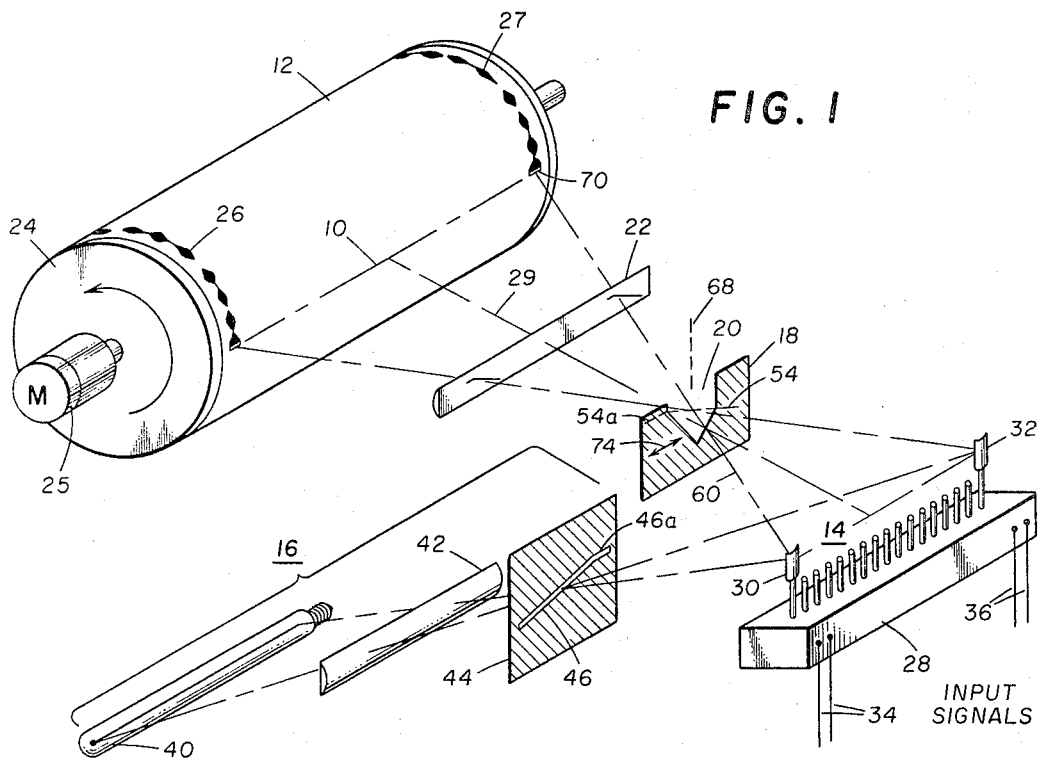
FIGURE 1 is a diagrammatic illustration of an oscillographic recorder for producing a plurality of double-sided variable area traces simultaneously.

Referring again to FIGURE 1, there is illustrated the presently preferred embodiment of the present invention for producing a plurality of double-sided variable area traces simultaneously. For simplicity, the structural details of the oscillographic recorder of FIGURE 1 are omitted. It will, of course, be understood that certain components are mounted in light-tight housings and all of the components are suitably interconnected with mechanical structure.

Briefly, the multichannel oscillographic recorder of FIGURE 1 includes a recording station 10 and a light-sensitive recording medium 12 movable past the recording station 10. A plurality of mirror galvanometers 14 are arranged in a row with each galvanometer mirror being pivotally mounted for oscillation about an axis parallel with the direction of movement of the recording medium 12 past recording station 10 in response to separate electrical signals. A linear light source 16 is so positioned to illuminate each galvanometer mirror that each mirror reflects a light beam whose cross-sectional shape includes a light bar inclined at an angle less than ninety degrees with respect to the axis of rotation of the galvanometer mirrors. A masking means 18 has a single aperture 20 tapering about a center line which is planar with the axis of rotation of the galvanometer mirrors. The masking means 18 blocks the light beam from each galvanometer except for the portion of each light beam passing through aperture 20 to a separate point on recording station 10. Optical means 22 is disposed between the masking means 18 and the recording station 10 for condensing the portion of each light beam passing through aperture 20 into a plurality of stationary, line-shaped images on recording medium 12. Each of the line-shaped images on recording medium 12 varies in length in proportion to the instantaneous magnitude of the electrical signal connected to the associated one of the galvanometers 14 whereby there is produced a double-sided variable area trace on recording medium 12.

Recording medium 12 is a photographic film having a light-sensitive emulsion. Medium 12 is wrapped around a cylindrical recording drum 24 which is rotated at a constant speed by motor 25. Recording drum 24 moves the recording medium 12 past the straight line recording station 10 in a direction tangent to the surface of recording drum 24 along recording station 10. The light beams reflected from galvanometers 14 to separate points on recording station 10 will expose separate tracks of the emulsion on medium 12. The exposed medium may then be processed to produce a visual record section. Ordinarily, a visual record section includes a black and white display, black indicating exposure. To end traces 26 and 27 on the recording medium 12 are illustrated diagrammatically as though they are observable to the eye while they are being produced.

The sesmic signals to be recorded in variable area format on recording medium 12 are supplied to a galvanometer bank 28 including a plurality of mirror galvanometers 14 arrranged in a row parallel to the recording station 10. Galvanometers 14 are arranged so that the middle of the group coincides with the center line 29 extending to the center of the recording station 10. The mirrors of only the end galvanometers 30 and 32 for producing the traces 27 and 26, respectively, are illustrated. Each of the mirrors of galvanometers 14 is preferably cylindrical and is pivotally mounted in bank 28 for oscillation about an axis parallel to one another and substantially parallel to the direction of movement of the recording medium 12 past recording station 10. The mirror of each of the galvanometers 14 oscillates about its axis by an angular amount proportional to the instantaneous magnitude of the electrical signal impressed upon its internal, unshown galvanometer coil. The electrical leads 34 and 36 are shown for galvanometers 30 and 32. The electrical signals appearing on leads 34 and 36 may be those resulting from the signals created by geophones as they receive seismic waves in the field. Alternatively, the electrical signals may be reproduced from a magnetic tape recorder including a magnetic tape on which are stored seismic signals recorded in the field.

Each of galvanometer mirrors 14 is so adjusted to reflect an individual light beam toward the tapering aperture 20 of masking means 18. Each of the light beams from the galvanometer mirrors 14 passes through aperture 20 in a crossfire arrangement and strikes the recording medium 12 at a separate point along the recording station 10. The light beam reflected by the galvanometer mirrors 14 lie in a common plane defined by the recording station 10 and substantially normal to the recording drum 24. The light beam reflected by each of the galvanometer mirrors 14 has an elongated cross-sectional shape in the form of a light bar, but only the center line of each reflected light beam is illustrated for simplicity in FIGURE 1.

Linear light source 16 uniformly illuminates each of the galvanometer mirrors 14 so that each mirror reflects a light beam whose cross-sectional shape includes a light bar inclined at an angle less than ninety degrees with respect to the rotational axis of the galvanometer mirrors. The linear light source 16 may include a lamp 40, a cylindrical lens 42, and a mask 44. Lamp 40 is an incandescent, cylindrical lamp with a long filament mounted parallel to the galvanometers 14. The cylindrical lens 42 is mounted with its cylindrical axis parallel to the lamp 40 so that it gathers the bundles of light rays from lamp 40 and collimates them in a direction toward the mirror galvanometers 14. The lens 42 has magnifying power in a direction perpendicular to the row of galvanometers 14.

Figure 2:
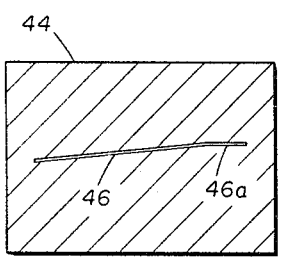
FIGURE 2 illustrates a plan view of the mask of FIGURE 1 for generating the light beam whose cross-sectional shape is an inclined light bar.

The mask 44, which is seen in plan view in FIGURE 2, is a thin plate positioned in the light path between lamp 40 and galvanometers 14. Preferably, mask 44 is located in the position illustrated in FIGURE 1. Alternatively, it may be located between the lamp 40 and the lens 42. It may suitably be held in position by a mechanical structure that permits easy interchangability of masks.

Mask 44 blocks the light rays from lamp 40 from reaching the galvanometer mirrors 14 except those passing through an inclined slit 46 and a flat slit 46a. Slit 46 is so positioned that each of the galvanometer mirrors 14 reflects a light beam whose cross-sectional shape includes a light bar inclined at an angle less than ninety degrees with respect to the rotational axis of the galvanometers. The cross-sectional shape of the light beam from galvanometer 30 is illustrated at 54 at the plane of the masking means 18. The inclination of the slit 46 will not necessarily be the same angle as that of the light bar 54 because of the action of the cylindrical lens 42 in magnifying in a direction planar with the axis of rotation of each of the galvanometer mirrors 14. The inclination of the slit 46 may vary from about sixty degrees to about eight-nine degrees with respect to the rotational axis of each of the galvanometer mirrors 14.

Flat slit 46a is positioned parallel to the row of galvanometer mirrors 14. Thus, the inclined bar 54 has at its upper left-hand end a flat portion 54a which is perpendicular to the rotational axis of the galvanometer mirrors 14. Slits 46 and 46a may be about .010 inch wide.

The masking means 18 blocks each of the light beams from the galvanometer mirrors 14 from reaching the recording station 10 except for the portion passing through the tapering aperture 20. Masking means 18 may be a thin plate positioned at a predetermined distance from the galvanometer mirrors 14 along reference center line 29. Aperture 20 tapers about center line 68 which is planar with the axis of rotation of the galvanometer mirrors 14 and intersects with the reference center line 29.

The tapering of aperture 20 is such that the cross-sectional light bar shape of the galvanometer beam from each of galvanometer mirrors 14 intersects the sides of aperture 20 at symmetrically equal distances from the center line 68 as each light beam oscillates. For example, the light beam 60 reflected by galvanometer 30 falls upon mask 18 in the shape of inclined light bar 54. Masking means 18 blocks light beam 60 except for the portion passing through aperture 20. The portion of light beam 60 passing through aperture 20 strikes the recording medium 12 at recording station 10 in a line-shaped image 70. As galvanometer mirror 30 oscillates in response to an electrical signal representative of seismic waves, the reflected light beam 60 oscillates transversely to the movement of the recording medium 12 so that the inclined light bar 54 moves transversely in the direction of arrow 74. As galvanometer mirror 30 oscillates about its axis, the portion of the inclined light bar 54 passing through the tapering aperture 50 varies symmetrically in length about the center line 68 so that the line-shaped image 70 at the recording medium 12 varies in length in proportion to the angular position of the mirror 30.

Figure 3:
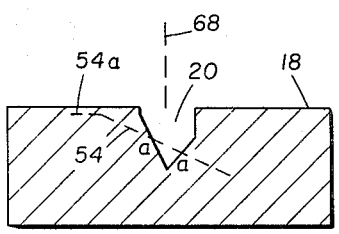
FIGURES 3 and 4 illustrate the masking means of FIGURE 1 with the inclined light bar projected thereon in two different positions.

A plan view of the masking means 18 is illustrated in FIGURE 3 with an image of the inclined light bar 54 superimposed thereon. In the position shown, the portion a—a of the inclined light bar 54 passes through aperture 20. The portion a—a then strikes the recording medium 12 in line-shaped image 70.

Figure 4:
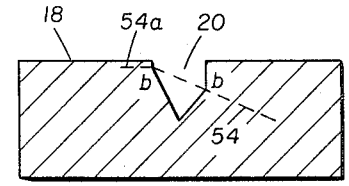

FIGURE 4 illustrates the inclined light bar 54 in another position superimposed on masking means 18. The galvanometer mirror 30 is rotated clockwise by an amount sufficient to shift the inclined light bar 54 to the right. Now, a portion b—b of light bar 54 passes through the tapering aperture 20.

Thus, it will be apparent that as the galvanometer mirror 30 rotates its angular position, the portion of the inclined light bar 54 passing through the tapering aperture 20 will vary in its overall length.

If in FIGURE 4 galvanometer mirror 30 rotates to an extreme position where the light bar 54 moves further to the right, the flat bar 54a will come into the aperture 50 so that a constant length of light passes through the aperture 50.

There will now be described the geometric details of the shape of the aperture 50 with reference to FIGURE 5, which is an enlarged view of aperture 20. Aperture 20 is a quadrilateral area bounded on at least three sides by the masking means 18. It is so shaped that the inclined light bar 54 intersects sides c–f, f–e, and e–d at symmetrically equal distances on either side of the center line 68. Thus, as the light bar 54 oscillates perpendicular to the center line 68, a symmetrically equal length of the light bar 54 passes through aperture 20. Aperture 20 is also constructed so that the variable area trace produced on recording medium 12 will have a maximum width. When light bar 54 is in the position illustrated in FIGURE 4, the maximum length of light passes through aperture 20. Now, as the light bar 54 moves even further to the right than shown, in a direction perpendicular to the center line 68, bar 54 begins to intersect along side d–e and the portion 54a begins to come into the left-hand upper side of aperture 20.

The shape of aperture 20 may be designed for a specific inclination of slit 46 in mask 44 and for a specific distance of the masking means 18 spaced from the galvanometers 14. Given a mask 44 with a slit 46 inclined at a predetermined angle, the light bar 54 in FIGURE 5 will be inclined at a predetermined angle with respect to the center line 68. Light bar 54 will be inclined at different angles and have different overall size depending upon the plane at which the masking means 18 is located spaced from the galvanometer mirrors 14.

Figure 5:
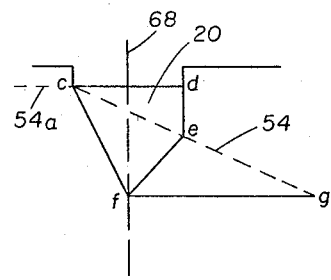
FIGURE 5 illustrates an enlarged view of the geometrical construction of the tapering aperture of the masking means of FIGURE 1.

FIGURE 5 illustrates an enlarged view of the shape of the aperture 20 at a predetermined location of the masking means 18 spaced from the galvanometers 14. At this predetermined location, the aperture 20 must be specifically designed for the optimum production of a variable area trace. The end points c and d are located at equal perpendicular distances from the center line 68. The side c–d may be of course open as illustrated in FIGURE 1, but the galvanometer light beams oscillate in an area bounded at the top by the side c–d. The length of side c–d determines the maximum width of the variable area traces on the recording medium. The side d–e is determined by dropping a line from point d parallel to center line 68 until point e intersects the light bar 54. The point f is determined by dropping a line g–f from the lower right-hand end of bar 54 perpendicular to the center line 68.

With aperture 20 so constructed as described above, the light bar 54 intersects equal distances along the sides f–c and f–e as the light bar oscillates perpendicular to the center line 68. Also, with the extreme amplitude signals that cause the galvanometer to move to an extreme rotational position, the light bar 54 moves even further to the right, as illustrated in FIGURE 5, and intersects the aperture 20 on the right side along side d–e and the portion 54a moves into the aperture 20 to make a continuous light beam passing through the aperture 50.

It will be appreciated that the flat slit 46a in the mask 44 (FIGURE 2) may be a continuation of the inclined slit 46 extended further than shown up to the right. Then the masking means 18 must be modified so that the aperture 20 includes a side extending upward from the point c in FIGURE 5 parallel to the center line 68. As the light bar 54 moves to the extreme position to the right, the portion 54a modified to be inclined along the main portion 54 will intersect the side extended upward from c. Providing the mask 44 with a flat slit 46a permits the aperture 20 to be shorter.

While it may seem that the portion of light bar 54 passing through aperture 20 oscillates up and down in addition to varying in length, the optical means 22 condenses the portion of the light beam passing through aperture 20 into a line-shaped image lying along recording station 10. The optical means 22 may be a cylindrical lens positioned with its cylindrical axis in the plane defined by the light beams. Lens 22 has minifying power in a direction planar with the rotational axis of the galvanometer mirrors 14 so that the light beam from each of the galvanometers is condensed into a stationary line-shaped image along recording station 10. For example, the portion of light beam 60 passing through aperture 20 is minified by lens 22 into stationary line-shaped image 70. Therefore, as the inclined light bar 54 oscillates transversely in the direction of arrow 74, the portion passing through aperture 20 varies in length and also oscillates in a direction perpendicular to recording station 10. However, by the action of cylindrical lens 22 the oscillation of the portion of light bar 54 passing through tapering aperture 20 is minified in the direction perpendicular to the recording station 10 so that this perpendicular oscillation is removed and the length of the stationary line-shaped image 70 varies in proportion to the length of intersection of the inclined light bar 54 with the edges of aperture 50.

The optical means 22 may also comprise a mirror system constructed to minify an incident light beam in the direction perpendicular to recording station 10.

In adjusting the galvanometer mirrors 14, it is customary to adjust them so that with no signal applied to the galvanometer a variable area trace of half maximum width is created on the recording medium 12. With the galvanometer so adjusted, the inclined light bar 54 falls in the position shown in FIGURE 3. The portion a—a passing through aperture 50 is one-half of the maximum width which can pass through aperture 20. Customarily, the gavanometers are so connected that swings clockwise correspond with a positive-going electrical signal and swings counterclockwise correspond with a negative-going electrical signal. The variable area trace produced on recording medium 12 will be all black of constant maximum width when the electrical signal goes positive above a maximum limit. As the electrical signal goes negative beyond a minimum limit, the variable area trace produced on the recording medium 12 will be all white so that there will be white gaps along the variable area trace. In FIGURE 4, the light bar 54 is in the position for the maximum trace width corresponding with the maximum level. As the electrical signal applied to a galvanometer goes negative beyond the minimum level, the light bar 54 moves to the extreme left position so that the lower end of light bar 54 is to the left of the lower end of aperture 20 and no light passes through the aperture.

As thus far described, the masking means 18 is located at a fixed distance from the galvanometer mirrors 14 so that traces on the recording medium 12 have a fixed trace spacing. In a preferred embodiment of the present invention, the masking means 18 is mounted on a carriage mechanism such as the one illustrated in FIGURE 9 of U.S. Patent 3,235,876. With the masking means 19 mounted on such a carriage, there may be provided several different masks with different shaped apertures 20 for different distances of the carriage from the galvanometer mirrors 14. Thus, the present invention may be used with different maximum trace widths and trace spacings by using different shaped tapering apertures in the masking means 18 as a movable carriage moves the masking means along the center line 29.

Combination wiggle-variable area recording

In another aspect of the present invention, there is provided a means for recording a wiggle trace in combination with a partially shaded variable area using a galvanometer whose mirror rotates in a direction transverse to the movement of a recording medium.

Refer now to FIGURES 6 and 7 where there is illustrated, respectively, a top and a side view of the oscillographic recording system of FIGURE 1 with modifications made to produce combination wiggle- variable area traces. The components of the system of FIGURES 6 and 7, which are the same as those in FIGURE 1, are given the same reference numerals. In this aspect of the invention, the masks 18 and 44 (FIGURE 1) are replaced with masks 82 and 92 to produce a combination wiggle-variable area record section on recording medium 12. Only the two end traces 94 and 96 of the record section recorded on medium 12 are illustrated. In actual practice, as was described with reference to FIGURE 1, all the galvanometers in bank 20 project a light beam through the aperture in mask 92 to produce a plurality of combination wiggle-variable area traces simultaneously on recording medium 12.

The combination wiggle-variable area traces are produced by projecting a pair of light beams from each galvanometer mirror, one beam for producing the wiggle portion of a trace and being unaffected by a mask and the other beam for producing the variable area portion of the trace and being affected by the mask. More particularly, the mask 82 in FIGURE 7 generates a light beam 98 with a cross section in the shape of a parallel light bar lying in the plane of FIGURE 7 and generates a separate light beam 99 with a cross section in the shape of an inclined light bar. A plan view of the mask 82 is shown in FIGURE 8. The mask 82 includes an inclined slit 102 and a flat slit 102a which are shaped similarly as described with reference to the slits 46 and 46a in FIGURE 2. Also included in the mask 82 is a small slit 104 with its longitudinal axis planar with the rotational axis of galvanometers 14. Slit 104 is positioned at the left-hand end of slit 102 and raised slightly above flat slit 102a. The slit 104 produces the beam 98 in FIGURE 7 and the slit 102 produces the beam 99.

The mask 92 is seen in plan view in FIGURE 9. Mask 92 includes a tapering aperture 106 through which a portion of the beam 99 projected through slit 102 passes and strikes the recording medium 12. The cross-sectional shape of beam 99 at the plane of mask 92 is seen as dashed line 103 in FIGURE 9. The inclined light bar 103 on mask 92 is similarly shaped and inclined to the direction of movement of the recording medium 12 as was the light bar 54 in FIGURE 1. The beam 98 emanating from slit 104 is shown at the plane of masking means 92 as the parallel bar 105.

As can be seen in FIGURES 6, 7, and 9, the beam 98 passes over the mask 92 without being blocked while the beam 99 is partially blocked by the mask 92. In the position for light bars 103 and 105 in FIGURE 9, no signal is being applied to the galvanometer 24. When a signal is applied to the galvanometer 24, its mirror rotates to cause the light bar 103 and the light bar 105 to oscillate together. If the galvanometer mirror 24 rotates clockwise in FIGURE 6, the light bar 103 and the light bar 105 move together to the right in FIGURE 9. As the bar 103 moves to the right, a portion of the light bar 103 passes through the aperture 106 and strikes the recording medium 12. The portion of light bar 103 passing through the aperture 106 is illustrated as beam 110 in FIGURE 6. Thus, as the galvanometer mirror 24 oscillates from its no signal position clockwise, a portion of the beam 99 passes through aperture 106 to form beam 110. Beam 110 then strikes the recording medium 12 in a line-shaped image 112. The beam 98 projected from galvanometer mirror 24 passes over the top of masking means 92 and strikes the recording medium 12 in a light spot 114.

As the galvanometer mirror rotates in response to its applied electrical signal, the light beam 98 oscillates in the plane of FIGURE 6 so that the light spot 114 oscillates along the recording station 10 and the wiggle portion of trace 96 is thus produced. Also, as the galvanometer mirror 24 rotates, the portion of the light beam 99 with an inclined light bar cross section, illustrated as 103 in FIGURE 9, comes into the aperture 106 and produces on recording medium 12 line image 112 which varies in length. Thus, the light spot 114 and the line-shaped image 112 cooperate to form the combination wiggle-variable area trace 96.

As described before with reference to the embodiment of FIGURE 1, the cylindrical lens 22 condenses both of the light beams 98 and 110 into images lying along recording station 10.

In FIGURE 9, the inclined light bar 103 and the light bar 105 are illustrated in the position where no signal is being applied to galvanometer 24. As the galvanometer mirror 24 rotates counterclockwise in response to a negative-going electrical wave, the bars 103 and 105 move in conjunction to the left. The mask 92 blocks all of the bar 103, but the bar 105 passes over the top of the mask to produce the negative-going wiggle portion of the trace 96. Now when the galvanometer mirror 24 rotates clockwise from the position shown in FIGURE 9 in response to positive-going electrical waves, the bar 105 and the bar 103 move in conjunction to the right. The light bar 105 passes over the top of mask 92 to produce the positive-going wiggle portion of the trace 96. Also, a portion of the bar 103 moves into the bottom of the tapering aperture 106. The portion of the bar 103 passing through the bottom of aperture 106 and in the form of beam 110 (FIGURE 6) forms the stationary line 112 and causes the trace 96 to be shaded in with variable area beneath the positive-going portion of the wiggle trace.

FIGURE 10 illustrates the light bars 103 and 105 in a second position superimposed on mask 92. In this position, the maximum amount of light passes through the aperture 106. When the bars 103 and 105 move further to the right, the bar 103 intersects a constant width across the upper part of aperture 106. If the bar 103 moves to an extreme position to the right, the portion 103a moves into the aperture 106 to produce a continuous beam across aperture 106.

The design of aperture 106 is illustrated in enlarged view in FIGURE 11 for one fixed position of the mask 92 spaced from the galvanometer mirrors 20. The aperture 106 includes a quadrilateral area with corners $h$, $i$, $j$, and $k$. The side $h-i$ may be open at the top but the remaining sides of the aperture 106 must be bounded by mask 92. The side $h-k$ is fixed along the reference center line 68. Side $h-k$ represents the fixed side of the variable area portion of trace 96. The corner $i$ is located at a fixed distance from the reference center line 68 such that the perpendicular distance to the center line 68 represents the maximum trace width for the variable area portion of trace 96. The side $h-i$ is drawn as an extension of the portion 102a of light bar 103. The side $i-j$ is determined by dropping a line parallel to the reference line 68 until the line intersects the light bar 103. The corner $k$ is determined by dropping a line $k-l$ from the lower right-hand end of bar 103 perpendicular to the reference line 68.

With the aperture 106 designed as described above, the light bar 103 intersects the sides $k-h$ and $k-j$ as it oscillates in a direction perpendicular to the line 68. When the light bar 103 moves to the extreme left so that its lower end is to the left of side $h-k$, none of the light bar passes through the aperture 106. When the light bar 103 moves to the extreme right, the light bar begins to ride up on the side $i-j$ and the portion 103a comes into the aperture and intersects side $h-k$ so that there is produced a variable area trace of this constant maximum width determined by the length of side $h-i$.

Now that the invention has been completely described and illustrated with reference to certain specific embodiments, it will become apparent to those skilled in the art that certain modifications may be made. It is intended to cover all such modifications as fall within the scope of the appended claims.

The invention claimed is:

1. An oscillographic recorder comprising:
    (a) a mirror galvanometer with its mirror pivotally mounted for oscillation about an axis in response to an applied electrical signal,
    (b) a linear light source so positioned to illuminate said mirror that said mirror reflects a light beam whose cross-sectional shape includes a light bar inclined at an angle less than ninety degrees with respect to said axis,
    (c) a recording station,
    (d) means for moving a light-sensitive recording medium past said recording station in a direction planar with said axis, and
    (e) masking means having an aperture tapering about a center line which is planar with said axis, said masking means blocking said light beam except for the portion passing through said aperture to said recording station whereby there is produced a variable area trace on said recording medium.

2. An oscillographic recorder as in claim 1 wherein said linear light source is comprised of:
    (1) a lamp, and
    (2) a mask having an inclined slit therein and blocking from said mirror the light rays from said lamp except the rays passing through said inclined slit, said inclined slit being so inclined that said mirror reflects a light beam whose cross-sectional shape includes a light bar inclined at an angle less than ninety degrees with respect to said axis.

3. An oscillographic recorder as in claim 2 wherein said mask includes, contiguous at one end of said inclined slit, a flat slit whereby said mirror reflects a light beam whose cross-sectional shape includes a light bar inclined at an angle less than ninety degrees with respect to said axis and at one end of said inclined light bar a flat light bar oriented perpendicular to said axis.

4. An oscillographic recorder as in claim 3 wherein said masking means includes:
    a plate having an aperture in the shape of a quadrilateral area with at least three sides bounded by said plate,
        a first and a second of said sides tapering outward from a common point on a center line planar with said axis and extending to first and second end points such that the inclined light bar cross section of said light beam at said plate intersects said first and second end points at equal distances from said center line, and
        a third side extending from the end point of the shorter of said first and second sides parallel to said center line.

5. An oscillographic recorder as in claim 1 wherein said masking means comprises a plate having an aperture tapering about a center line planar with said axis such that the cross-sectional light bar shape of said light beam at said plate intersects the sides of said aperture at symmetrically equal distances from said center line as said light beam oscillates whereby there is produced a double-sided variable area trace on said recording medium.

6. An oscillographic recorder as in claim 1 comprising further:
    optical means disposed between said masking means and said recording station for condensing the portion of said light beam passing through said aperture into a stationary line-shaped image on said light-sensitive medium whereby said line-shaped image varies in length in proportion to the instantaneous amplitude of said electrical signal and produces a variable area trace on said recording medium.

7. An oscillographic recorder comprising:
    (a) a mirror galvanometer with its mirror pivotally mounted for oscillation about an axis in response to an applied electrical signal,
    (b) a recording station,
    (c) means for moving a light-sensitive medium past said recording station in a direction planar with said axis, (d) a linear light source so positioned to illuminate said mirror that said mirror reflects a first light beam whose cross-sectional shape includes a light bar inclined at an angle less than ninety degrees with respect to said axis, (e) a second light source so positioned to illuminate said mirror that said mirror reflects a second light beam to said recording station, (f) masking means having a tapering aperture and blocking said first light beam except for the portion passing through said aperture to said recording station, and (g) optical means disposed between said masking means and said recording station for condensing the portion of said first light beam passing through said aperture into a stationary line-shaped image on said recording medium lying along a line perpendicular to said axis and for condensing said second light beam into a spot lying along said perpendicular line whereby there is produced a combination wiggle-variable area trace on said recording medium.

8. An oscillographic recorder as in claim 7 wherein said linear light source and said second light source are comprised of:

a lamp, and a mask having therein an inclined slit and a parallel slit at one end of said inclined slit, said mask blocking from said mirror the light rays from said lamp except the rays passing through said inclined slit and said parallel slit, said inclined slit being so inclined that said mirror reflects a first light beam whose cross-sectional shape includes a light bar inclined at an angle less than ninety degrees with respect to said axis, said parallel slit being positioned so that said mirror reflects a second light beam whose cross-sectional shape extends planar with said axis and does not intersect said first light beam, and wherein said masking means includes:

a plate having an aperture with one side planar with said axis and another side tapering outward from an end of said one side.

9. A multichannel oscillographic recorder comprising:

(a) a plurality of mirror galvanometers arranged in a row, each galvanometer mirror being pivotally mounted for oscillation about an axis parallel to one another in response to separate electrical signals, (b) a linear light source so positioned to illuminate each galvanometer mirror that each mirror reflects a light beam whose cross-sectional shape includes a light bar inclined at an angle less than ninety degrees with respect to said axis, (c) a recording station lying along a straight line parallel to said galvanometers, (d) a recording drum for moving a light-sensitive recording medium past said recording station in a direction perpendicular to said recording station, (e) masking means having a single aperture tapering about a center line which is planar with said axis, said masking means blocking the light beam from each galvanometer mirror except for the portion of each light beam passing through said aperture to a separate point on said recording station, and (f) optical means disposed between said masking means and said recording station for condensing the portion of each light beam passing through said aperture into a plurality of stationary line-shaped images on said recording medium whereby there are produced a plurality of double-sided variable area traces on said recording medium.

References Cited

UNITED STATES PATENTS

| 2,059,083 | 10/1936 | Browne | 179—100.3 |
| 2,289,075 | 7/1942 | Ruth | 179—100.3 |
| 3,048,847 | 8/1962 | Frost et al. | 346—109 X |
| 3,129,999 | 4/1964 | Brown et al. | 346—109 |

RICHARD B. WILKINSON, *Primary Examiner.*

J. W. HARTARY, *Assistant Examiner.*